(12) United States Patent
Cook et al.

(10) Patent No.: US 11,178,152 B2
(45) Date of Patent: Nov. 16, 2021

(54) METHOD AND SYSTEM FOR LIVE DATING

(71) Applicant: The Meet Group, Inc., New Hope, PA (US)

(72) Inventors: Geoffrey Cook, New Hope, PA (US); Anton Djamoos, New Hope, PA (US); David Weinstein, New Hope, PA (US); Omar Beiruty, New Hope, PA (US); Jeremy Zorn, New Hope, PA (US)

(73) Assignee: The Meet Group, Inc., New Hope, PA (US)

( * ) Notice: Subject to any disclaimer, the term of this patent is extended or adjusted under 35 U.S.C. 154(b) by 231 days.

(21) Appl. No.: 16/582,334

(22) Filed: Sep. 25, 2019

(65) Prior Publication Data
US 2021/0037020 A1 Feb. 4, 2021

Related U.S. Application Data

(60) Provisional application No. 62/879,646, filed on Jul. 29, 2019.

(51) Int. Cl.
| | |
|---|---|
| *G06F 15/16* | (2006.01) |
| *H04L 29/06* | (2006.01) |
| *G06F 16/9535* | (2019.01) |
| *H04L 29/08* | (2006.01) |

(52) U.S. Cl.
CPC ........ *H04L 63/102* (2013.01); *G06F 16/9535* (2019.01); *H04L 63/08* (2013.01); *H04L 65/1069* (2013.01); *H04L 67/306* (2013.01)

(58) Field of Classification Search
CPC . H04L 63/107; H04L 65/1069; H04L 67/306; G06F 16/9535

USPC ............... 709/220, 224, 226, 227, 228, 232
See application file for complete search history.

(56) References Cited

U.S. PATENT DOCUMENTS

| | | | |
|---|---|---|---|
| 10,546,326 B2* | 1/2020 | Publicover | ....... H04N 21/25883 |
| 10,580,043 B2* | 3/2020 | Publicover | ............ H04L 67/306 |
| 10,599,714 B2* | 3/2020 | Lee | ................... H04N 21/44226 |
| 2011/0223576 A1* | 9/2011 | Foster | ...................... G09B 7/02 434/362 |
| 2016/0253710 A1* | 9/2016 | Publicover | ......... H04N 21/4532 705/14.66 |
| 2020/0265084 A1* | 8/2020 | Lee | ..................... H04N 21/4532 |

(Continued)

OTHER PUBLICATIONS

Sprecher et al.; "The Influence of Parents and Friends on the Quality and Stability of Romantic Relationships: A Three-Wave Longitudinal Investigation"; Journal of Marriage and Family; vol. 54; 1992; p. 888-900.

*Primary Examiner* — Khanh Q Dinh
(74) *Attorney, Agent, or Firm* — BakerHostetler

(57) ABSTRACT

Nextdate provides an online dating and game experience for all participants, including live streamers, contestants, and viewers. Nextdate offers advantages over both offline and online speed dating. In respect to offline speed dating, Nextdate is better in that it provides conversational prompts to the participants (the "star" and the contestant), as well as a "Love-o-meter" and audience comments that provide additional items and context to which the participants can respond. In respect to online speed dating, Nextdate includes features that remove the friction from traditional online dating experience and encourage user participation. Nextdate may be implemented as a standalone app or as a tab or feature of another video-centric social networking app.

13 Claims, 13 Drawing Sheets

(56) References Cited

U.S. PATENT DOCUMENTS

2020/0349610 A1\* 11/2020 Publicover .......... G06F 16/2358
2020/0349611 A1\* 11/2020 Publicover ......... H04N 21/2187

\* cited by examiner

METHOD AND SYSTEM FOR LIVE DATING

CROSS REFERENCE

This application claims priority to U.S. Provisional Application No. 62/879,646, "METHOD AND SYSTEM FOR LIVE DATING," filed on Jul. 29, 2019, which is hereby incorporated by reference in its entirety.

TECHNICAL FIELD

The present disclosure relates generally to the field of computer-based social networking, and more specifically to a mobile or desktop app or feature in a mobile or desktop app (called "Nextdate") that enables users to interact in a live dating game.

BACKGROUND

Businesses that provide computer-based social networks spend considerable capital to build websites and mobile apps that will keep a large and constantly growing base of users engaged. To be successful, the business model must include ways to "monetize" the user base, i.e., encourage the users to spend money on the network. The present inventors have determined that the users of live video solutions spend more time per day and monetize at a substantially higher rate than other users. A goal of the present invention is to provide a new dating game/activity that can be implemented on a video platform, thereby providing a larger base of active users.

SUMMARY

Nextdate provides an on-line dating and game experience for all participants, including live streamers, contestants, and viewers. Nextdate offers advantages over both offline and online speed dating. In respect to offline speed dating, Nextdate is better in that it provides conversational prompts to the participants (the "star" and contestant), as well as a "Love-o-Meter" and audience comments that provide additional items and context to which the participants can respond. In respect to online speed dating, Nextdate includes features that remove the friction from traditional online dating experiences and encourage user participation. These are discussed below.

Nextdate may be implemented as a standalone app or as a tab or feature of another video-centric social networking app. Nextdate enables everyone to be the star of their own dating show. Nextdate may also have a nightly event, "The Dating Hour," during which the tab will be active and a push notification will be sent to active users alerting them to the game. Additional features are described below.

DETAILED DESCRIPTION OF ILLUSTRATIVE EMBODIMENTS

Figure 1:
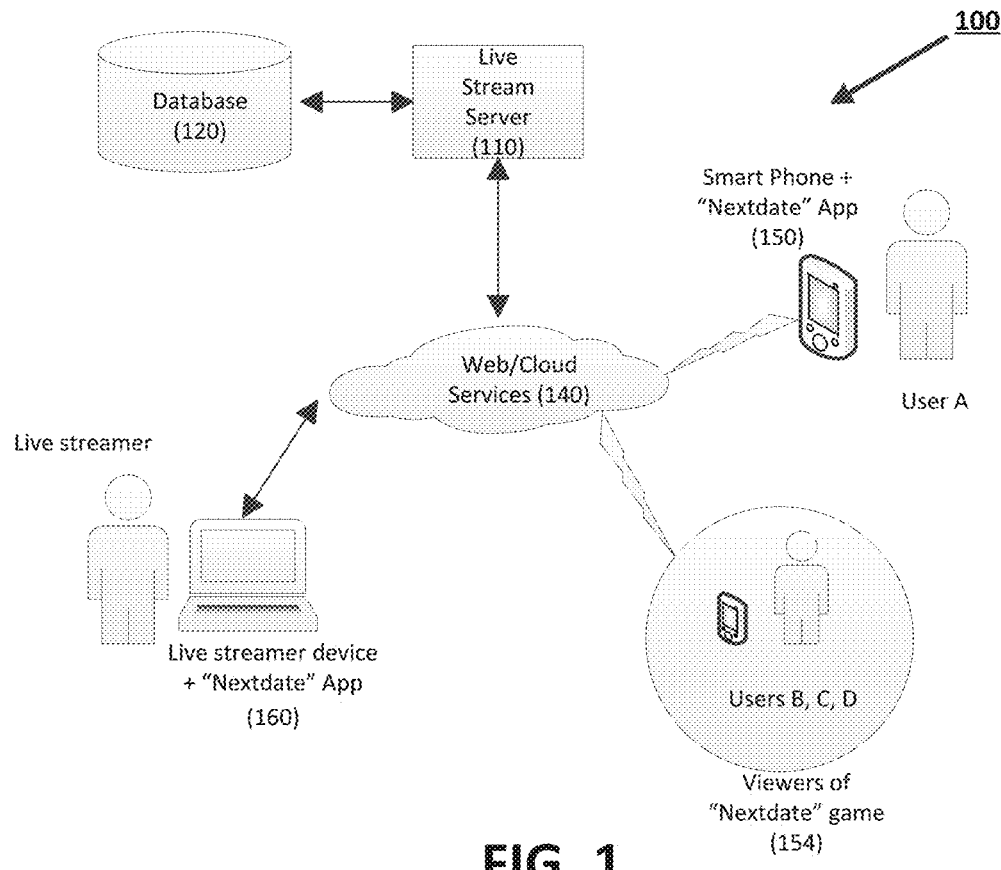
FIG. 1 schematically depicts an illustrative embodiment of a technological platform for enabling users to interact in a live dating game.

The Nextdate app and Nextdate game are designed to drive more users into a related video platform. The game contains a number of novel features, including:

A way to be the star of your own dating show anytime, anywhere.

A way for audiences to choose the "star" or "stars" they want to watch based on age, gender, location.

A way to find "stars" to date by age, gender, location.

A way for contestants to line up to date the "star".

A way to enable gamified audience participation, e.g., by allowing the audience to rate the contestant publicly via a "Love-o-meter" and also to add comments that the star, viewers, and contestant can view (together these inform the star's decision on who they will choose to date).

A way to display different prompts to the "star" that will be displayed onscreen so that he/she can keep the conversation going, given most users of video struggle to keep a conversation going.

A way for the "star" to choose within a given timeframe (marked by a countdown timer) whether to "date" or "next" a contestant and to provide additional communication privileges to those who the "star" chooses to "date": namely inclusion in "My Dates" and access to 1:1 Private Video.

A way for the contestant or the audience to give a virtual gift to the "star" where such virtual gift can be redeemed for offline value via PayPal or gift cards. The contestant may give a gift to gain the "star's" attention and show their seriousness or signal their wealth. The audience may give a gift to gain the streamer's attention, potentially before attempting to join as a contestant.

Nextdate is Different from Offline Speed Dating

Traditional speed dating is a way to meet new people in a romantic fashion that faces several fundamental flaws. Logistically, forcing people into a single room limits the amount of people that can participate at once. Nextdate revolutionizes the speed dating concept by opening up a speed date experience to all on the planet at the same time through the availability of the mobile or desktop application. With the mobile or desktop application, a member does not need to go anywhere in person and can find the love of their life from wherever they want and on their own time, decreasing pressure and improving confidence to lead to more successful matches. Nextdate solves the issue of choice by enabling you to connect with anyone in the world who matches your desired age/gender/location needs.

Unlike traditional speed dating where you have no choice in whom to date, Nextdate allows contestants to queue up for specific people that they want to date. In the traditional speed dating setting, when matched with someone, the experience can be awkward as it is difficult to know exactly what to talk about, nor is there a positive feedback loop from third-party feedback (friends/family/etc.) that research suggests can strengthen a relationship. (See, Sprecher, S., & Felmlee, D. (1992). The influence of parents and friends on the quality and stability of romantic relationships: A three-wave longitudinal investigation. Journal of Marriage and the Family, 54(4), 888-900.) Nextdate solves the awkwardness of not having anything to say with the Nextdate prompt. Nextdate solves the third-party feedback issue with the Love-o-Meter and audience comments that provide additional items and context for the "star" and contestant to respond to.

Nextdate is Different from Online Speed Dating

Online speed dating has always been 1:1. Nextdate exposes these 1:1 conversations to an audience. Less than 5 out of a 100 people will be willing to put themselves on video. In heterosexual dating, speed dating then involves matching a tiny fraction of males with a tiny fraction of females. Nextdate recognizes the friction to video creation and enables audience to participate by viewing, commenting, and rating, rather than streaming. By encouraging users to engage in this way with the product ahead of creating video, we believe we will also increase the rate of video creation as users who are familiar with the product will be more likely to take the plunge into video content creation.

What's more, online speed dating in previous implementations has been random. This "roulette" experience is awkward and undesirable for most users. Nextdate enables the contestants to choose who they want to date and empowers the "stars" to "Next" anyone they deem unsatisfactory.

In addition to innovating on the speed dating mechanics by providing an audience and a way for contestants to choose whom to date, Nextdate is different from online speed dating by enabling audience participation via the Love-o-meter and comments, enabling prompts so that the "star" can keep the conversation going, and enabling gifting so that the contestant can "stand out" and signal their seriousness and wealth.

Platform Technology

FIG. 1 depicts an illustrative embodiment of a platform 100 in accordance with the present invention. As shown, the platform 100 includes a server computer 110, which we call the "Nextdate" server. The server 110 is coupled to a database 120 and to a network 140 as a web service. In this way, the Nextdate server can be communicatively coupled with the user's (or star's) smart phone including the "Nextdate" user app 150, which in this example is used by a person we call "User A". One or more live streamer devices, or contestant devices, 160 (also including the "Nextdate" app) as well as additional users of the app 154 may also be included on the platform 100. In this illustration, the additional users 154 (whom we call User B, User C, User D, etc.) are assumed to be viewers of a game involving Live Streamer 160 and User A of device 150.

Figure 2:
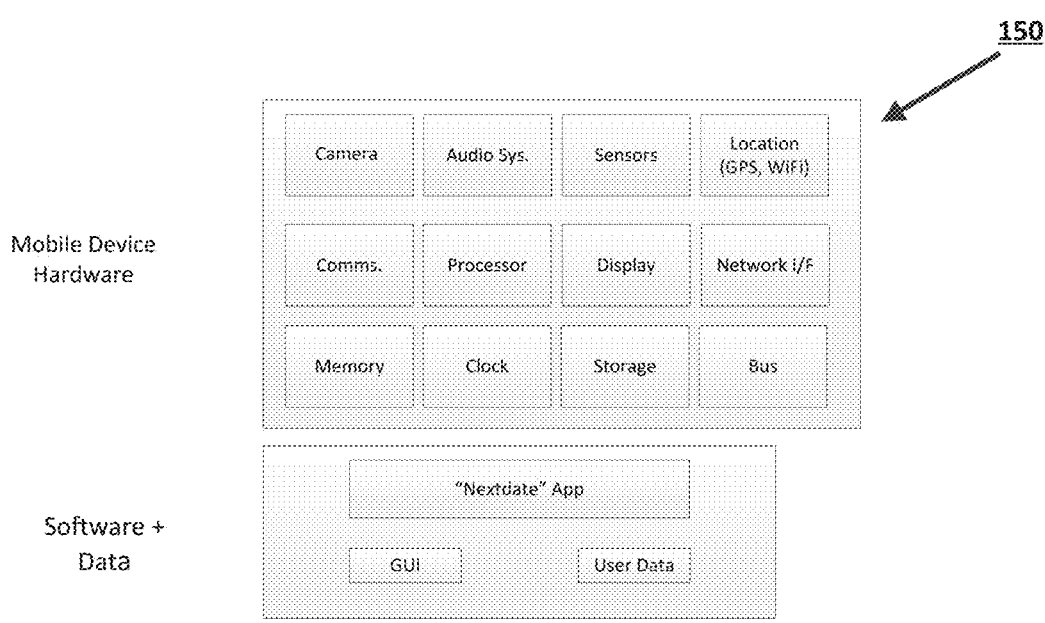
FIG. 2 is a block diagram depicting the hardware components of a mobile device and the software and data components of the inventive Nextdate app.
Figure 3:
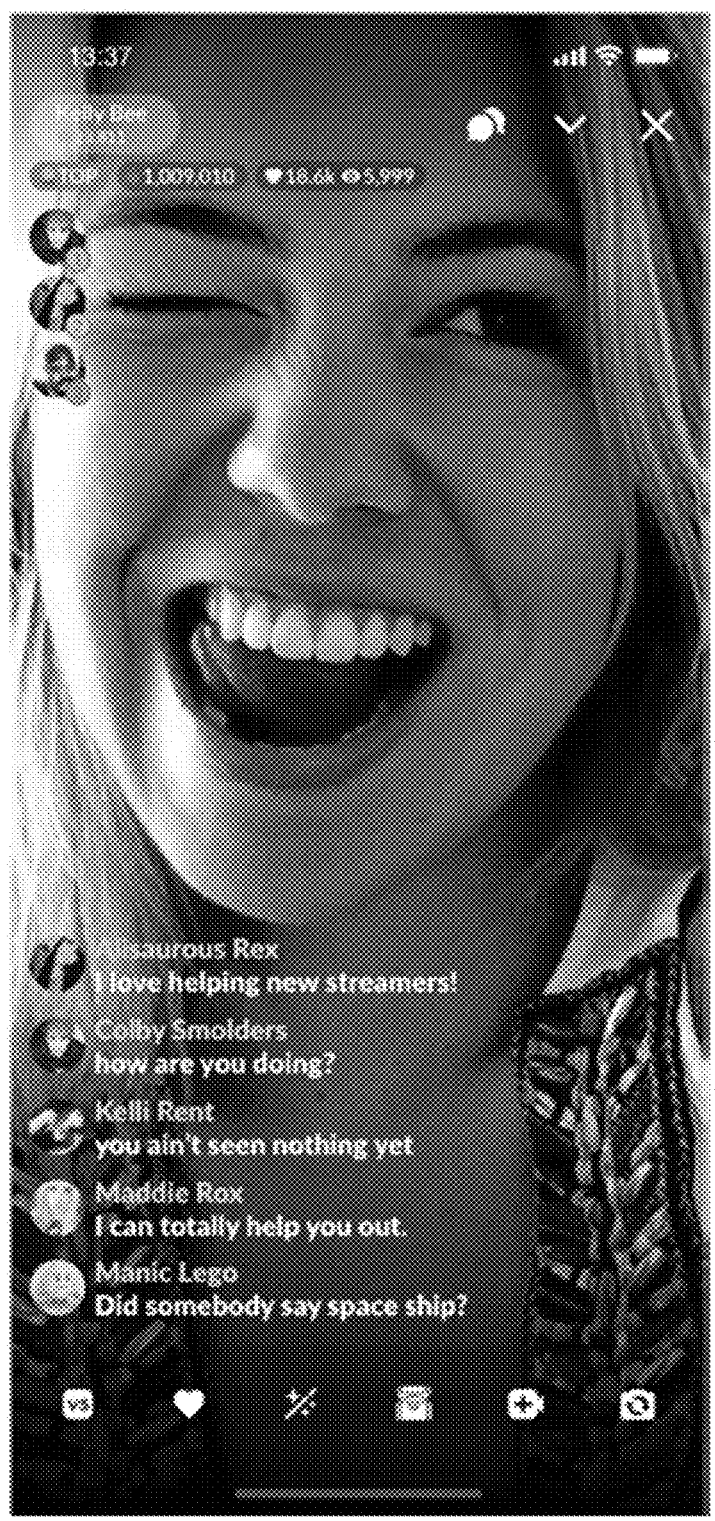
FIG. 3 depicts an interface of a mobile device when a Nextdate game is not activated by the streamer.
Figure 4:
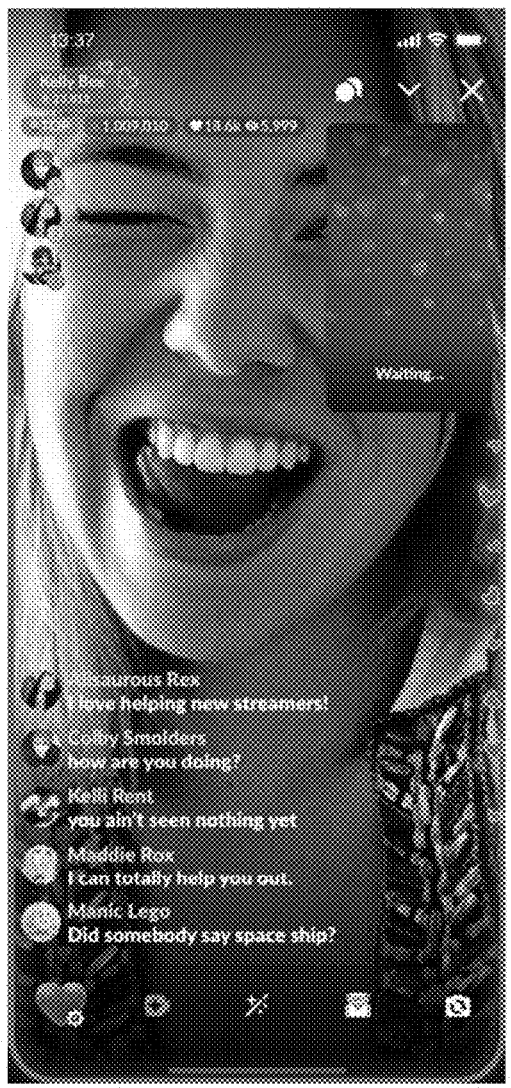
FIG. 4 depicts an interface of a mobile device when a Nextdate game is activated by the streamer.
Figure 5:
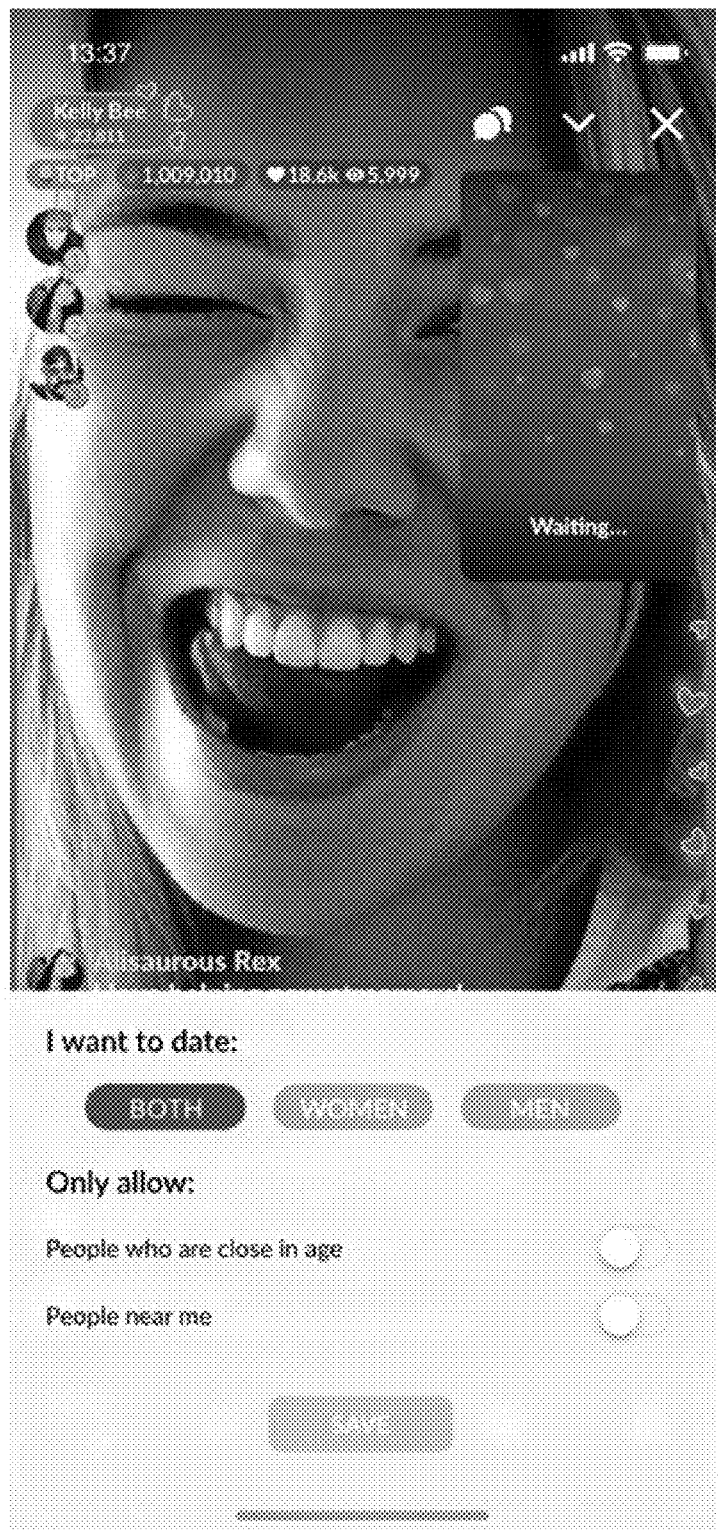
FIG. 5 depicts a filter tool that a host can use to filter who can and cannot join the line to play the game.
Figure 6:
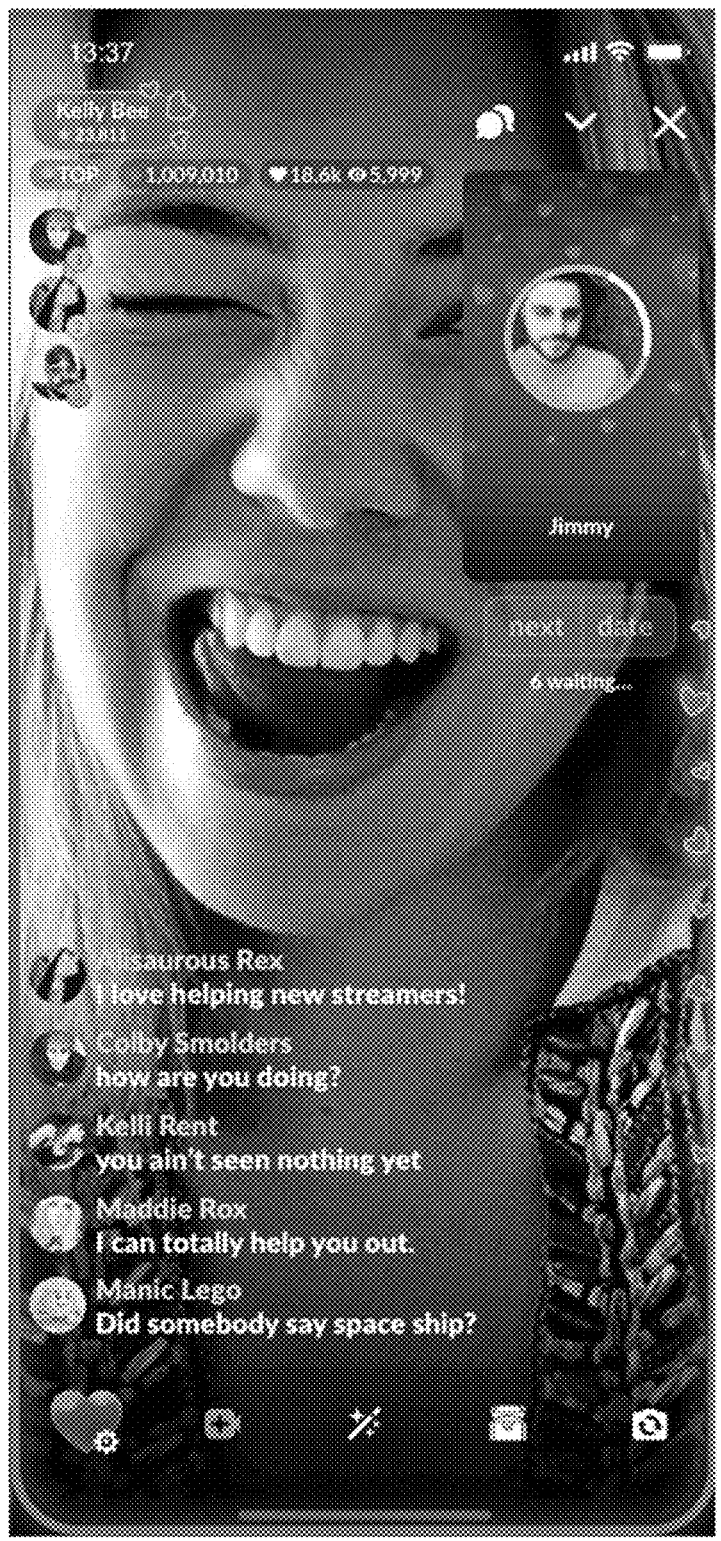
FIG. 6 depicts a contestant in-line experience for a streamer.
Figure 7:
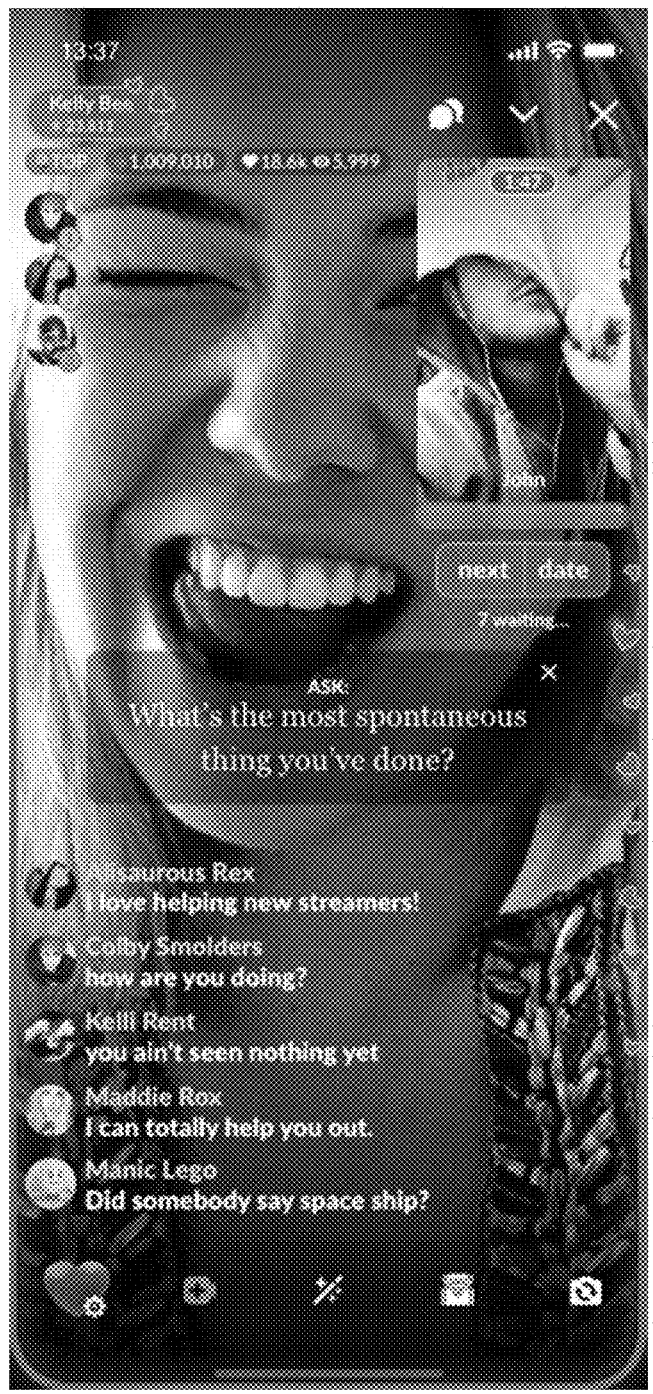
FIG. 7 depicts a contestant in-line experience for a second streamer.
Figure 8:
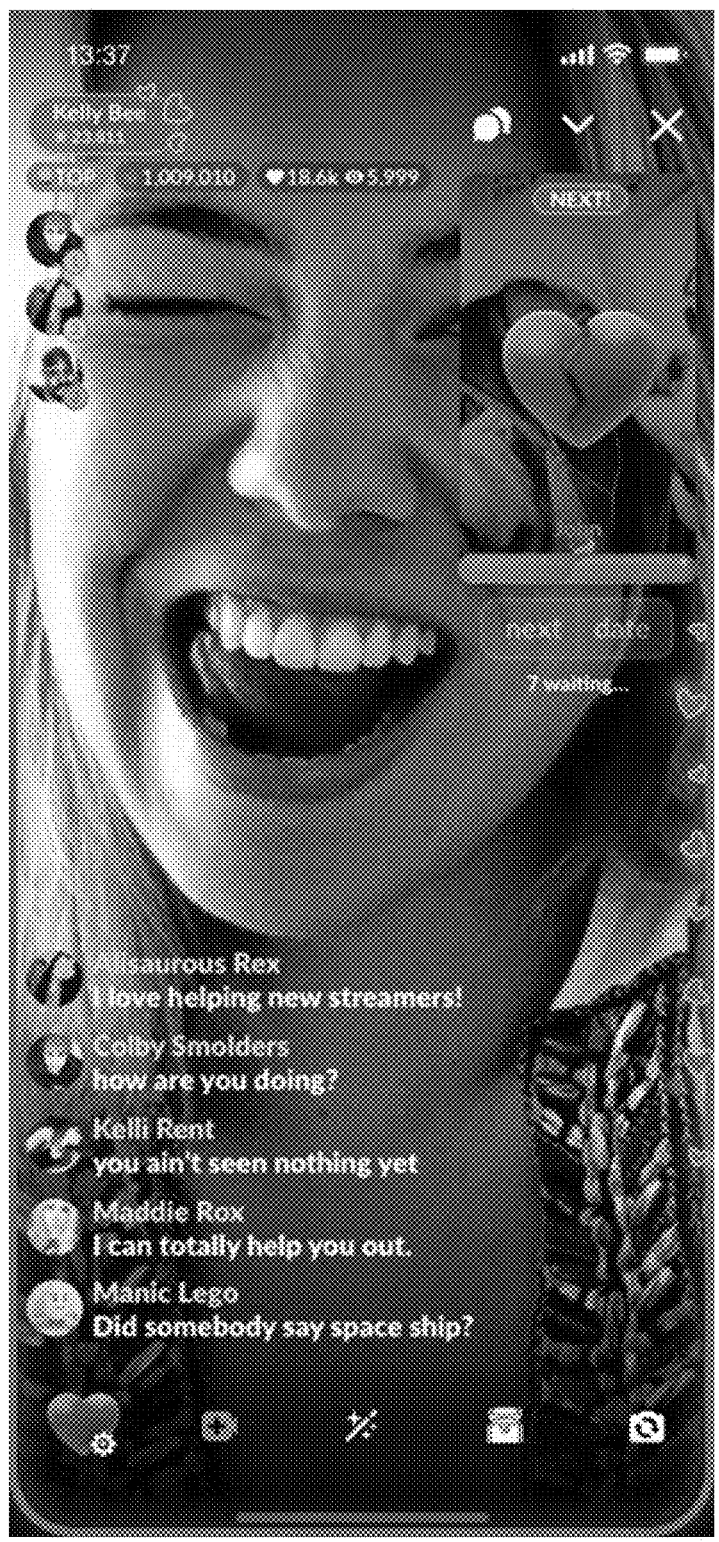
FIG. 8 depicts a heartbreak animation that is displayed when the host removes the current guest.
Figure 9:
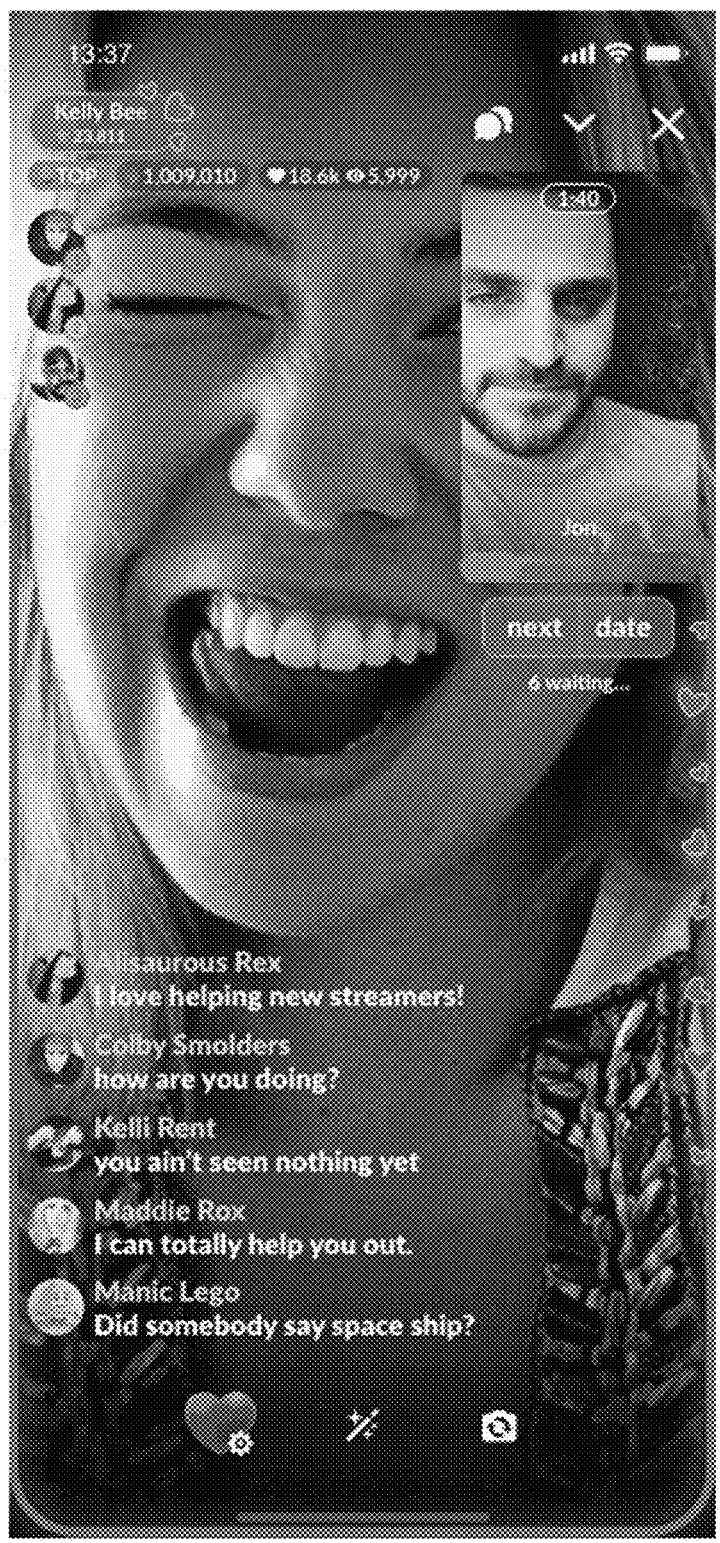
FIG. 9 depicts a date button that the host can press.
Figure 10:
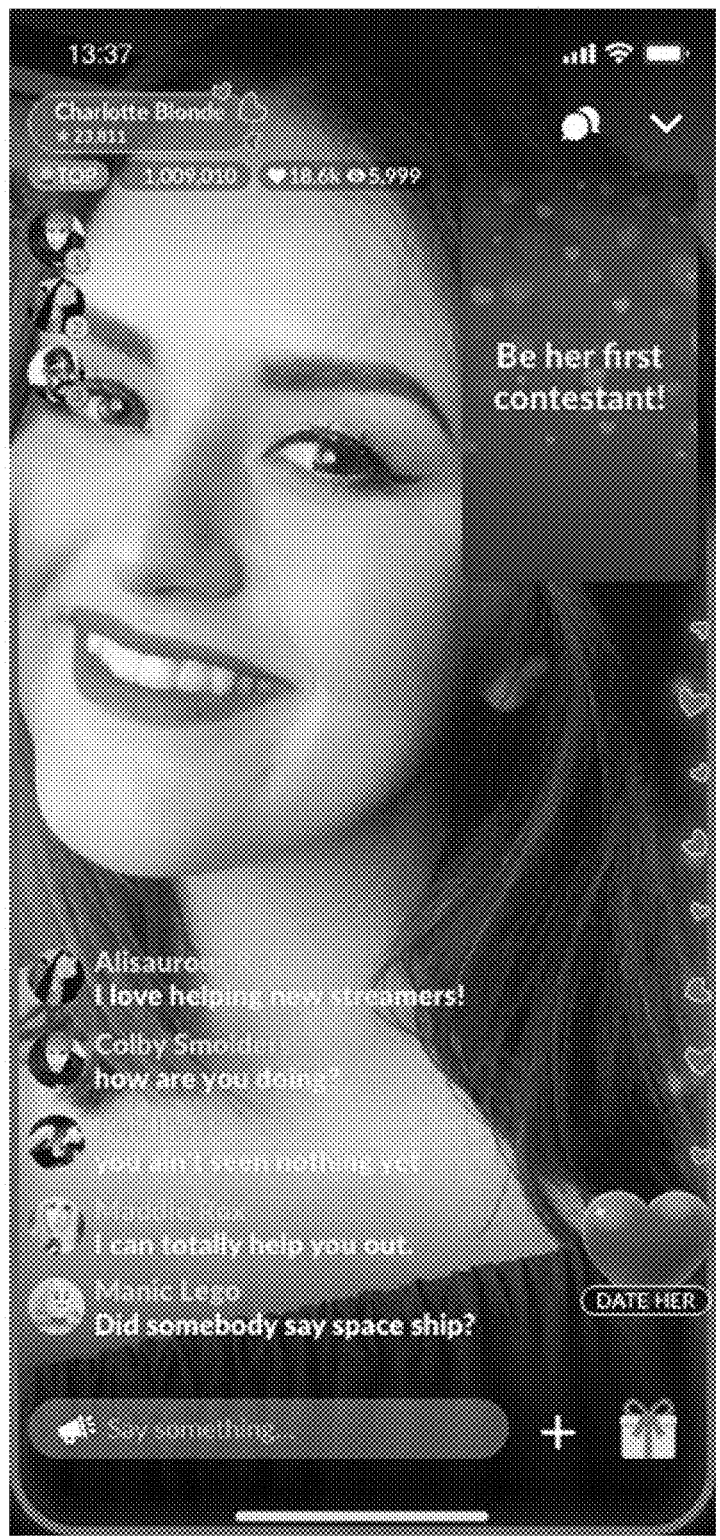
FIG. 10 depicts a viewer interface when the viewer is in a stream that does not have Nextdate activated.
Figure 11:
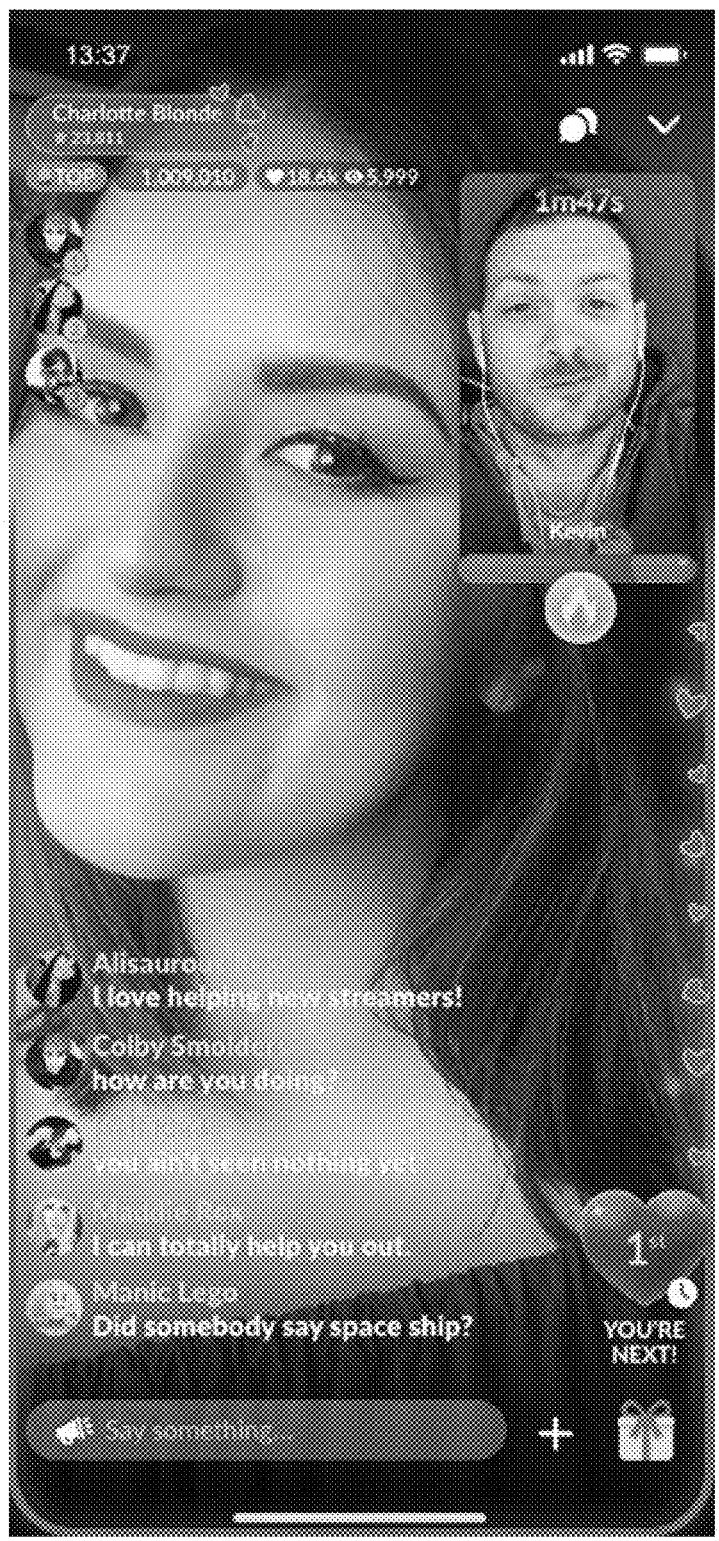
FIG. 11 depicts a viewer joining the game.
Figure 12:
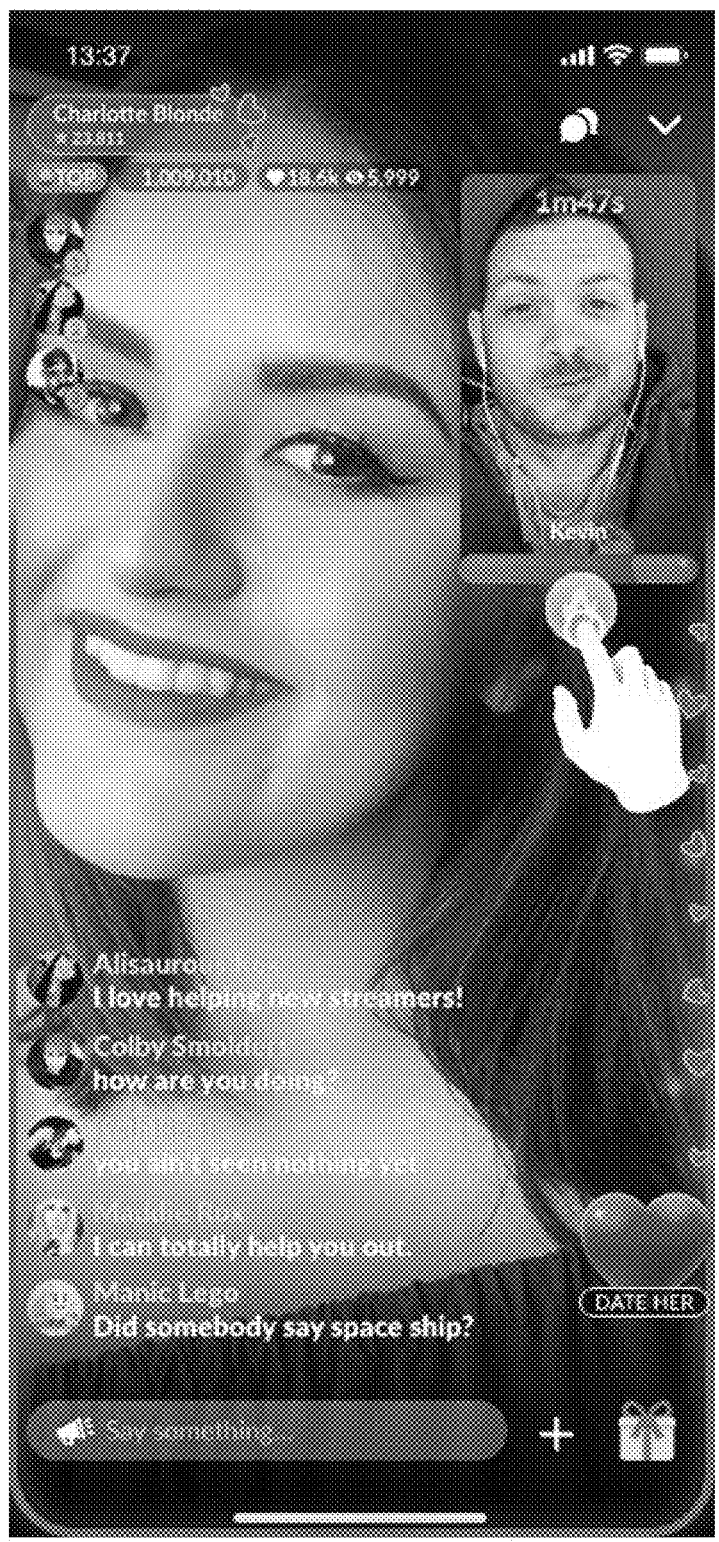
FIG. 12 depicts the Nextdate audience interaction mechanic.
Figure 13:
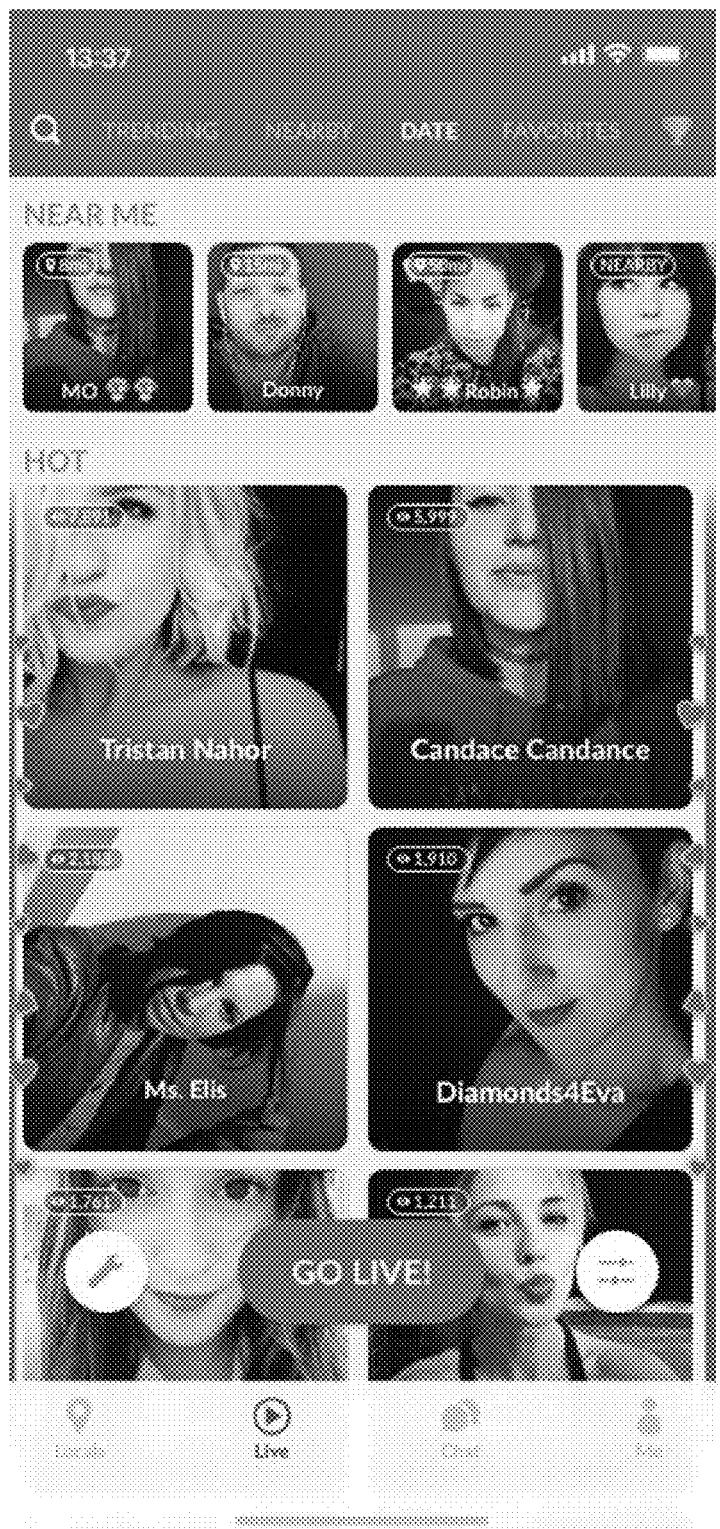
FIG. 13 depicts the Nextdate tab within the "live" tab.
Figure 14:
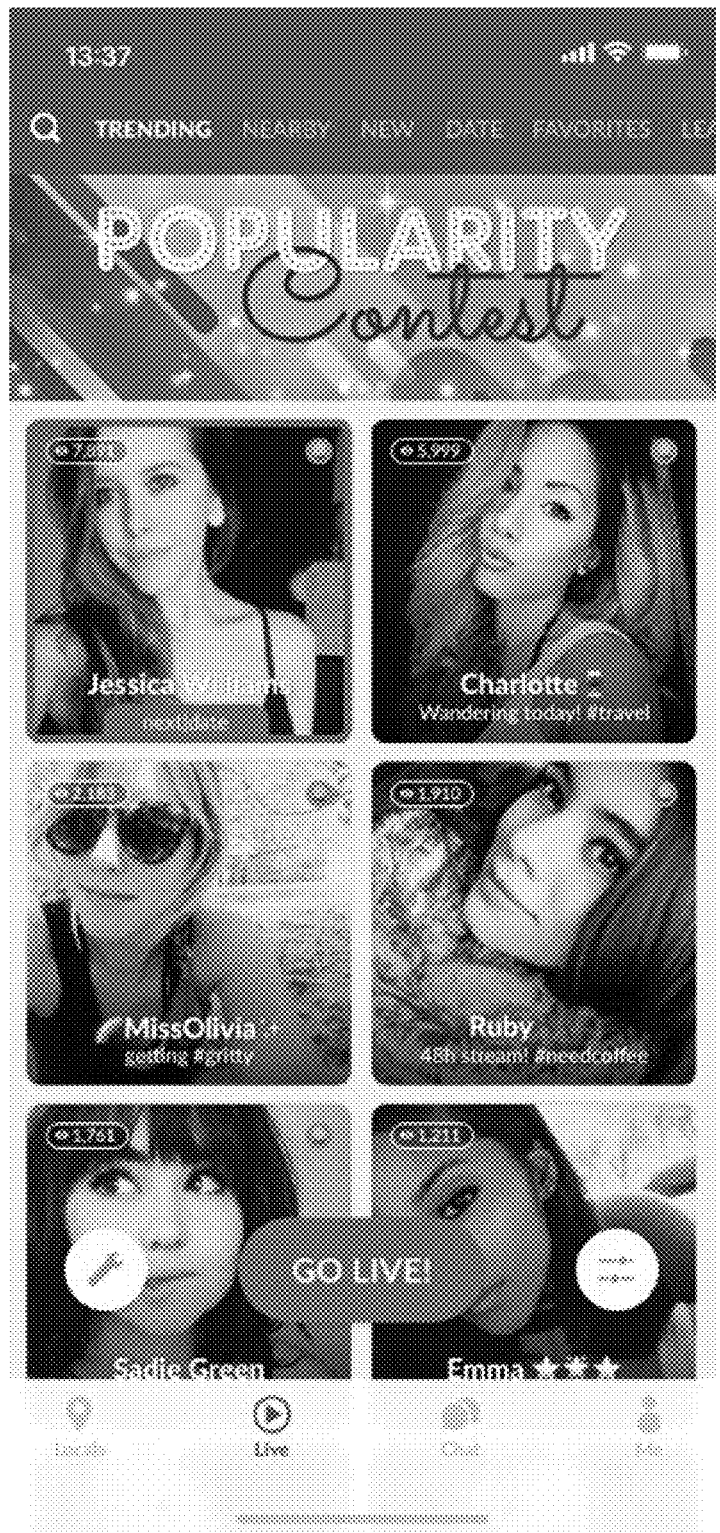
FIG. 14 depicts additional tab placements.

FIG. 2 is a block diagram depicting the hardware components of the mobile user device, and the software and data components of the inventive mobile user app, which we call the "Nextdate" app. FIG. 2 illustrates several components of an exemplary user device 150 in accordance with one embodiment. In various embodiments, user device 150 will preferably include a mobile device, such as a smartphone, but may also include a desktop PC, workstation, laptop, tablet, appliance, or other computing device that is capable of performing operations such as those described herein. In some embodiments, user device 150 may include many more components than those shown in FIG. 2. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware. In FIG. 2, we show the mobile device hardware components separately from the components of the "Nextdate" app.

As shown, the hardware components include a processor, memory, clock, and storage, as well as a camera, audio system (including an audio output for headphones/earbuds), sensors, and a location subsystem (e.g., a GPS or Wi-Fi based location system). The components of the "Nextdate" app include the software and data to enable the Nextdate game as discussed herein.

In various embodiments, user device 150 may comprise one or more physical and/or logical devices that collectively provide the functionalities described herein. In some embodiments, user device 150 may comprise one or more replicated and/or distributed physical or logical devices. In some embodiments, the user device 150 may comprise one or more computing resources provisioned from a "cloud computing" provider. In addition, a typical user device 150 will include a bus interconnecting several components including a network interface, display, central processing unit, and a memory. The memory generally comprises a random access memory ("RAM"), and the storage generally comprises a permanent non-transitory mass storage device, such as a hard disk drive or solid-state drive. An operating system (not shown) will also be present in memory.

Nextdate Game

In the following sections, we describe various aspects of the user experience. This description is entirely sufficient to enable a person skilled in the art to make and use the inventive Nextdate game.

Inactive Game Experience

When a Nextdate game is not activated by the streamer, the streamer should see a new Heart icon that, on press, initiates the Nextdate game experience.

Nextdate Active Experience

While a Nextdate game is active, the host will wait for viewers to join the game. Certain functionality should be hidden while the game is active:

Guest

If a guest is currently active, the streamer should be prompted to end the guest stream before proceeding with a Nextdate game.

Any existing guest requests in the queue can be removed.

The icon should be hidden.

Treasure Drop

Battles (Conversely, the Nextdate icon should not be visible while in a Battle)

At any time, the streamer may choose to tap the X button at top right, which will bring up the option to end the stream or end the Nextdate game.

End the Stream

Closes the stream as it would today.

End Nextdate Game

This will end the Nextdate game and return the stream to the standard, Nextdate-inactive state.

Cancel

This will dismiss the prompt.

While a Nextdate game is active, the stream itself should transform visually to a more "romance-ified" view, with the streamer's nameplate and the sides changing to red and having hearts.

Filters

The host will have the ability to filter who can and cannot join the line to play the game.

Options

Gender (Both|Men|Women)

People who are close in age

This should be a configurable value, N from the member's current age.

(e.g. +/−8 years . . . meaning that a 30-year-old would allow anyone from age 22-38 to play the game).

Contestant in Line Experience for Streamer

When a contestant joins the line to be a part of the game, they will queue up in a line, and that will be the order in which they may play.

There will be A way for paying to skip the line in a future implementation.

Starting with first in line, the member loads into the game and then begins a two-minute timer (which can be configured to other times easily and is expected to be in the range of 60 sec to 5 min) in which the contestant will try to win the affection of the streamer.

The streamer will always see the number of contestants in the queue beneath the guest placement.

In order for the conversation to remain flowing, prompts will display (only for the streamer) that will come from an internally-generated list.

The streamer may swipe through to see more or press the X button to close the prompts for the duration of the game or until they tap a button to show the prompts again There is a Next button underneath the guest placement that the host can press, which immediately removes the current guest and replaces that person with the next person in the queue.

This also displays a "heartbreak" animation.

There is a Date button underneath the guest placement that the host can press.

On press, the host and the contestant in the game are added to each other's "My Dates" section (defined later).

On press, the host application should automatically send a message from each member to each other in order to satisfy the privacy requirements for private video chat and to unlock private chat for each participant.

On press, there should be an animation conveying that a Date happened (to all in the stream) along with the benefits.

After press, the Date button should be disabled until the next contestant is visible.

The Love-o-meter (defined later) should remain full until the end of the contestant's time in the guest box.

Viewer (Contestant) Experience In-Game

When a viewer is in a stream that does not have Nextdate activated, there should be nothing different from the current experience.

When a viewer is in a stream that has Nextdate activated, the view changes to display the streamer's nameplate and side of the screen in red with hearts.

Along with the guest view now visible with a prompt to the audience to join the game, there is also a new "DATE <HIM/HER>" button that exists.

Joining the Line Experience for Viewer

On tap of the "DATE <HIM/HER>" button, the member will join into the line.

The member must give BOTH camera and microphone permissions before joining the line.

If there are no contestants active at the moment, the joining member will immediately begin playing the game.

If there is an active contestant, the joining viewer will be placed into a queue and have the join button reveal in realtime what place in line that person is.

The text beneath is modified depending on the placement:

Next in line (first place)—"You're next!"

No one in line—"Be first!"

Any other spot—"Waiting"

If the viewer has already played the game in this active game (joining the line does not count . . . he/she must have been on camera) or does not match up with the host's chosen filters, on tap to join the filter, he/she should receive an error that prevents from joining the line.

Nextdate Game Experience as Contestant

While in the game, the viewer is able to interact with the streamer in a small video guest window, with a timer controlling how long he/she is visible (unless the host acts with a NEXT action prior to the timer running out).

Nextdate Audience Interaction Mechanic: The Love-o-Meter

As a viewer, while watching the game, you have the ability to view and interact with the Love-o-Meter in order to communicate how you feel about the contestant.

Each viewer (NOT the host or contestant) has a "flame" button visible that they can press and hold in order to charge the Love-o-Meter (similar to how hearts in Live work).

The meter itself increases and decreases in realtime from an algorithm based on the factors of viewers voting and the number of viewers currently active in the stream.

Inputs include:

People watching the stream

Length of time people watching press the button

Nextdate Tab within Live

Currently, in the "Live" tab for video SDK, we have different tabs in the top navigation bar, such as "Trending"/"Nearby"/"New"/"Favorites" etc. We will be adding a new tab called "DATE".

For now, it will be positioned between the "NEW" tab and "FAVORITES" tab, though the order should be configurable.

When the DATE tab is selected, the top navigation bar color should change to Red and the tab should be in the "selected" state, displaying two sections: "NEAR ME" and "HOT".

Near Me Section within Date

At the top of the Date tab, there should be a scrollable marquee titled "NEAR ME".

The "NEAR ME" section should return all streams have Nextdate active and are within a configurable N miles from the viewer.

The "NEAR ME" section will also be subject to double-sided filters such that the age/gender/location filters of viewer match the filters of star Each stream preview in the "NEAR ME" section should show the following pieces of information:
The streamer's profile photo
The streamer's name
The distance label (how far the streamer is from the viewer's location
(The general design should follow the standard set with the Nearby Marquee.)

This section should only display if there are at least N (configurable, defaults to 3) active Nextdate games near the member. If there are less than that value, the section will be hidden.

Hot Section within Date

Beneath the "NEAR ME" section will be a section called "HOT".
(If the "NEAR ME" section is hidden, then this will be the only section on this page).

This section should return all active Nextdate streams with the following conditions:
It is subject to double-sided filters on age/gender/location
It can inherit whatever Trending algorithm is currently in use and which is a function of historical and current viewers and monetization on given streamers
A streamer can display simultaneously in the NEAR ME and HOT sections.

Each stream preview in the "HOT" section should show the following pieces of information:
The streamer's profile photo
The streamer's name
Any relevant badging
(The general design should follow the standard set with the Trending tab.)

On tap of one of these previews, the member will begin viewing the stream.

The Date tab will share filters with the general Live advanced filters:
A first time Next Date user will see results corresponding to his preexisting Live filter choices
A filter change made on the Date tab will impact the results on all other tabs Other Tab Placements In any of the non-Date tabs, e.g. "Trending" or "New" or "Favorites", etc., any stream that has a Nextdate game active should be decorated differently so that the user can easily and quickly be informed that a Nextdate game is taking place.

This decoration should be configurable on/off via Consul:
Enabled—the decoration is displayed on stream previews
Disabled—the decoration is not displayed on stream previews Future Development Plans A way for paying to skip the line A way for rewarding two people who connected successfully on Nextdate with a gift card if they meet up in real life, which will be confirmed based on geographic proximity as determined by their mobile device (future development).

A way for driving maximum density among the userbase by having a nightly livestreaming dating event/show at a particular time (like 9 pm) and lasting a pre-defined time (like 1 hour). A push would be sent to users in the minutes prior to the event beginning. To the extent the Nextdate game is available at all times, then the additional hook for the nightly show/event is the gift card award (future development).

What is claimed is:

1. A system for computer-based live communication, the computing system comprising:
a server;
a database communicatively coupled to the server, the database comprising a plurality of star profiles, each star profile comprising star traits and star preferences;
a processor; and
a memory communicatively coupled to the processor, the memory storing programmatic code that, when executed by the processor, causes the computing system to at least:
authenticate a connection from a star device to the server, the star device associated with a first star profile selected from the plurality of star profiles, wherein the first star profile comprises first star traits and first star preferences;
establish a connection from a plurality of contestant devices to the server;
select a contestant device from the plurality of contestant devices, the contestant device associated with a second profile selected from the plurality of profiles, wherein the second profile comprises second traits and second preferences, the second traits compatible with the first star traits and the second preferences compatible with the first star preferences;
receive, from the star device, live star video and audio output;
obtain, from the contestant device, contestant video and audio output;
authenticate a connection from the star device to the contestant device;
display the live star video and audio output on an interface of the contestant device;
show the contestant video and audio output on an interface of the star device;
authenticate a connection from an audience device to the server;
show a countdown timer on the interface of the star device, contestant device, and audience device; and
present the live star video and audio output and the contestant video and audio output on an interface of the audience device.

2. The system of claim 1, wherein the programmatic code, when executed by the processor, further causes the computing system to queue a second contestant device from the plurality of contestant devices, wherein the second contestant device is associated with the star profile.

3. The system of claim 2, wherein the countdown timer informs the star of a limited period in which to decide whether to "date" or "next" a contestant and to provide additional communication privileges to those who the star chooses to "date".

4. The system of claim 1, wherein the interface of the audience device comprises a live feedback mechanism.

5. The system of claim 4, wherein the programmatic code, when executed by the processor, further causes the computing system to at least:
receive, from the audience device, live feedback output, wherein the live feedback output is produced by the live feedback mechanism.

6. The system of claim 1, wherein the programmatic code, when executed by the processor, further causes the computing system to at least:

send a conversational prompt to the interface of the star device, the conversational prompt comprising a question to facilitate discussion between the star device and the streamer device.

7. A method for computer-based live communication, the method comprising:
   authenticating a connection from a star device to the server, the star device associated with a first star profile selected from the plurality of star profiles, wherein the first star profile comprises first star traits and first star preferences;
   establishing a connection from a plurality of contestant devices to the server;
   selecting a contestant device from the plurality of contestant devices, the contestant device associated with a second profile selected from the plurality of profiles, wherein the second profile comprises second traits and second preferences, the second traits compatible with the first star traits and the second preferences compatible with the first star preferences;
   receiving, from the star device, live star video and audio output;
   obtaining, from the contestant device, contestant video and audio output;
   authenticating a connection from the star device to the contestant device;
   displaying the live star video and audio output on an interface of the contestant device;
   showing the contestant video and audio output on an interface of the star device;
   authenticating a connection from an audience device to the server;
   showing a countdown timer on the interface of the star device, contestant device, and audience device; and
   presenting the live star video and audio output and the contestant video and audio output on an interface of the audience device.

8. The method of claim 7 further comprising queuing a second contestant device from the plurality of contestant devices, wherein the second contestant device is associated with the star profile.

9. The method of claim 8, wherein the countdown timer informs the star of a limited period in which to decide whether to "date" or "next" a contestant and to provide additional communication privileges to those who the star chooses to "date".

10. The method of claim 7, wherein the interface of the audience device comprises a live feedback mechanism.

11. The method of claim 10 further comprising:
   receiving, from the audience device, live feedback output, wherein the live feedback output is produced by the live feedback mechanism.

12. The method of claim 7, further comprising:
   sending a conversational prompt to the interface of the star device, the conversational prompt comprising a question to facilitate discussion between the star device and the contestant device.

13. A computer-readable medium comprising programmatic code for computer-based live communication, the programmatic code comprising:
   instructions for authenticating a connection from a star device to the server, the star device associated with a first star profile selected from the plurality of star profiles, wherein the first star profile comprises first star traits and first star preferences;
   instructions for establishing a connection from a plurality of contestant devices to the server;
   instructions for selecting a contestant device from the plurality of contestant devices, the contestant device associated with a second profile selected from the plurality of profiles, wherein the second profile comprises second traits and second preferences, the second traits compatible with the first star traits and the second preferences compatible with the first star preferences;
   instructions for receiving, from the star device, live star video and audio output;
   instructions for obtaining, from the contestant device, contestant video and audio output;
   instructions for authenticating a connection from the star device to the contestant device;
   instructions for displaying the live star video and audio output on an interface of the contestant device;
   instructions for showing the contestant video and audio output on an interface of the star device;
   instructions for authenticating a connection from an audience device to the server;
   instructions for showing a countdown timer on the interface of the star device, contestant device, and audience device; and
   instructions for presenting the live star video and audio output and the contestant video and audio output on an interface of the audience device.

* * * * *